United States Patent
Johnson

[11] Patent Number: 5,971,438
[45] Date of Patent: Oct. 26, 1999

[54] MOBILE VEHICLE SEWAGE REMOVAL SYSTEM

[76] Inventor: Albert P. Johnson, 71 Lora Way, Roseville, Calif. 95661

[21] Appl. No.: 09/193,033

[22] Filed: Nov. 16, 1998

[51] Int. Cl.⁶ .................................................. F16L 25/00
[52] U.S. Cl. ........................... 285/12; 285/179; 285/253; 285/397; 285/423; 285/903
[58] Field of Search ................................ 285/12, 179, 903, 285/360, 361, 376, 396, 401, 402, 397, 423, 253; 137/240, 355.16, 899; 4/321, 323; 141/382, 383, 384

[56] References Cited

U.S. PATENT DOCUMENTS

| | | | |
|---|---|---|---|
| 2,696,264 | 12/1954 | Colmerauer et al. | 285/397 X |
| 4,133,347 | 1/1979 | Mercer | 285/402 X |
| 4,480,855 | 11/1984 | Rosenbaum | 285/903 X |
| 4,660,860 | 4/1987 | Todd | 285/12 |
| 4,708,370 | 11/1987 | Todd | 285/12 |
| 4,722,556 | 2/1988 | Todd | 285/179 X |
| 5,333,910 | 8/1994 | Bailey | 285/12 |
| 5,417,460 | 5/1995 | Lunder | 285/903 X |
| 5,667,256 | 9/1997 | Caine | 285/12 X |

*Primary Examiner*—Dave W. Arola
*Attorney, Agent, or Firm*—Heisler & Associates

[57] ABSTRACT

A sewage removal system 10 is provided for quickly, securely and sanitarily connecting the onboard holding tank H of a typical recreational vehicle or travel trailer to an in-ground stationary waste disposal site S. The system 10 includes two hoses 20, 21 which may be coupled via a union 50 to provide hoses 20, 21 of greater combined length to reach the site S when located too far for a single hose 20, 21. The hoses 20, 21 include quick connect couplings 30 secured to each end 22. Locking hooks 40 extend from the annular rims 39 of the couplings 30 to provide a means for securely engaging protrusions 56, 66 to create a sealed joint. The system 10 includes two elbow adapters 60 to allow simple connection to an inlet tube T of the stationary waste disposal site S. The first elbow adapter 60 includes a male threaded connector 70 for coupling with a female threaded fitting F of the inlet tube T. A second elbow adapter 60 includes a female threaded connector 80 for connection to a male threaded fitting M of the inlet tube T.

20 Claims, 4 Drawing Sheets

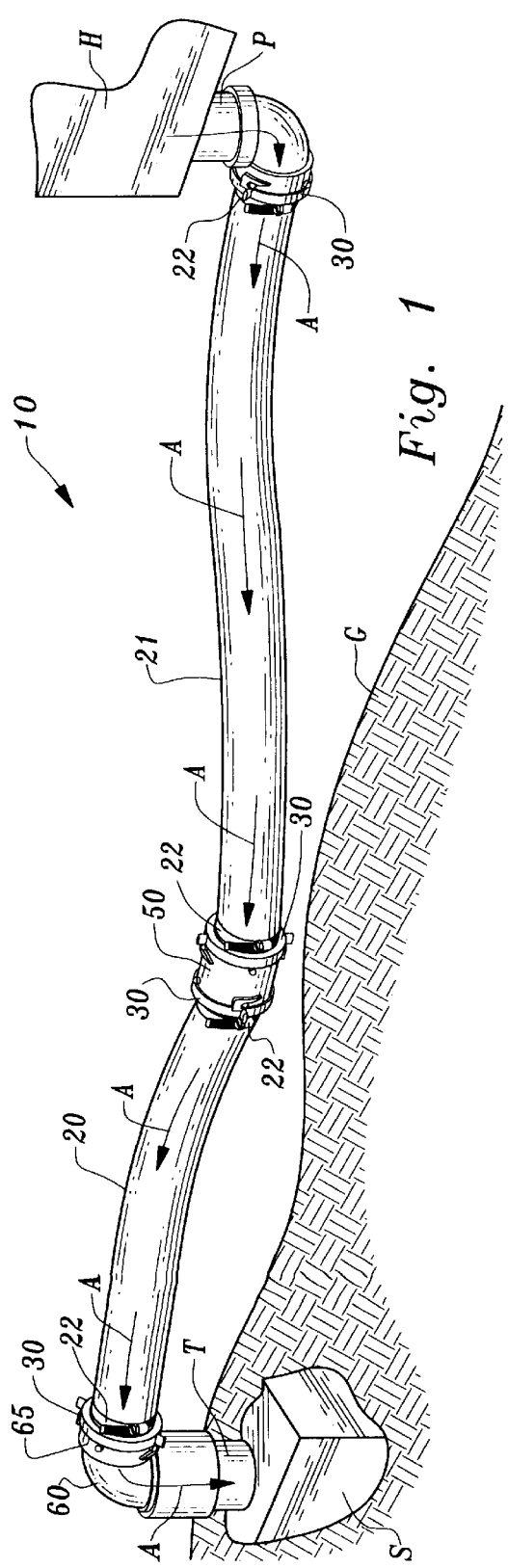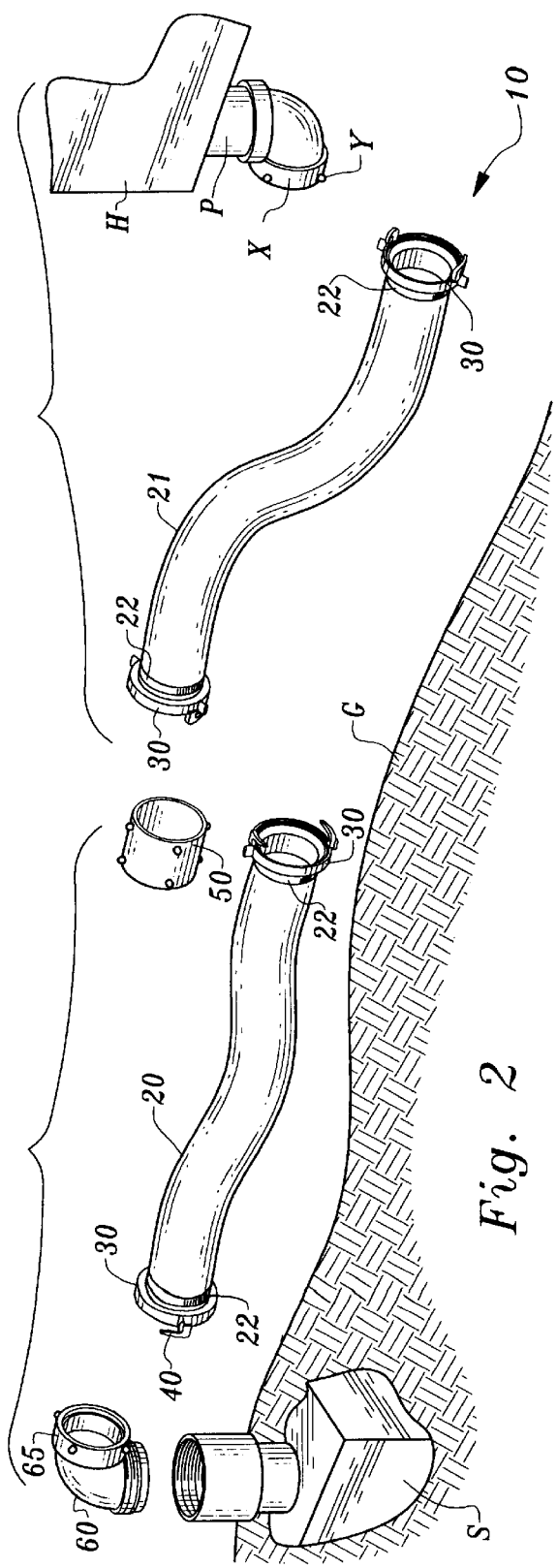

MOBILE VEHICLE SEWAGE REMOVAL SYSTEM

FIELD OF THE INVENTION

This invention relates to sewage removal systems for mobile vehicles. More particularly, this invention relates to such systems which include appropriate adapters and associated quick-connect couplings for quickly, securely and sanitarily connecting to a stationary waste disposal site.

BACKGROUND OF THE INVENTION

Large, motorized recreational vehicles ("RV's") and towable travel trailers, have become a popular mode of travel for retirees and other vacationers. RV's and travel trailers allow a person to travel in comfort without requiring prior arrangement of hotel reservations. An RV traveler needs only to locate an RV trailer park or campground en route, drive in and park, setup the RV/travel trailer, and relax for the evening. Luggage and other belongings do not need to be carried into or out of a motel room each time the traveler moves to a new location. An RV/travel trailer is effectively, a self-contained "home on wheels." As such, an RV/travel trailer typically includes its own onboard toilet system, including an associated sewage holding tank.

Since the key feature of an RV or travel trailer is its mobility, the size of an onboard sewage holding tank is necessarily limited to avoid placing too sizable a load on the RV/travel trailer which would substantially detract from the fuel efficiency of the RV or travel trailer towing vehicle. Hence, while traveling or periodically camping, arrangements need to be made to dispose of accumulated sewage. To that end, an RV/travel trailer's holding tank is equipped with a discharge or outlet pipe extending out the bottom of the holding tank. Two separate sewage disposal modes are typically encountered when traveling in an RV or with a towed travel trailer.

In a first mode, during active freeway operation, sewage is typically disposed of at an appropriate stationary waste disposal site found en route at a truck stop, gas station or campground. These sites typically provide a vertical threaded tubular riser or inlet tube through which the accumulated sewage may be dumped into the stationary waste disposal site. Typically, a free end of a sewage hose connected to the outlet pipe on the RV/travel trailer sewage holding tank is inserted into the interior of the riser. This free end typically does not have an appropriate fitting to allow it to seal with the tubular riser of the stationary waste disposal site. The accumulated sewage is released from the tank, and travels through the sewage hose into the inground stationary disposal site.

Because the hose is not sealed to the riser, this disposal method is unsanitary and may result in spills of raw sewage about the waste disposal site, causing an unsightly and inappropriate health hazard for future users. Additionally, the party disposing of sewage is forced to deal with a free end of the sewage hose that must be thoroughly washed off and disinfected to avoid inadvertent peripheral contamination by raw sewage. The washing and disinfection process may also cause raw sewage to be inadvertently strewn about the waste disposal site.

In a second mode, with the RV or travel trailer parked at a campsite for an extended period of time, sewage may be dumped immediately and continuously from the onboard holding tank into a sewage manifold and collection system accessible from each parking space at the campsite. The free end of a sewage hose may once again be inserted into a tubular riser at each parking space which is connected to the campsite sewage collection manifold system. This connection system is also undesirable since it creates an open sewage system that can pose a significant health hazard. The open system could clog or fill with rain water which could cause unsightly and unsanitary back flow of raw sewage about the point of connection near the parked RV/travel trailer, once again creating a potentially hazardous health situation. Also, different parts have different sizes and threaded coupling configurations, making establishment of a sealed interface difficult.

Accordingly, a need exists for an RV/travel trailer sewage removal system that can be easily, quickly and sanitarily connected and disconnected from male or female threaded risers of different sizes at a stationary waste disposal site or collection system.

SUMMARY OF THE INVENTION

The present invention is a sewage removal system for providing a positive sealed connection between the onboard holding tank of an RV or travel trailer and an inlet tube of a stationary waste disposal site. The system includes two elbow adapters to accommodate threadable engagement of the adapters with male or female threaded fittings atop the threaded inlet tube from the stationary waste disposal site. The adapters each include a collar at an upper end which has radially extending knobs. The knobs are sized to mate with locking hooks which extend from sealing quick-connect couplings joined to ends of a hose of the removal system. The system also includes a union which allows two hoses to be joined to create one hose of greater length to accommodate waste disposal site connections which are further from the onboard holding tank and cannot be reached with just one length of hose.

The couplings with locking hooks are attached to each end of a sewage hose. The locking hooks are designed to rotatably and functionally engage the protrusions extending from the outer surface of either the hose union, the collar on one of the two elbow adapters or the outlet pipe of the holding tank. When fully engaged, the locking hooks draw the end of the coupling against the end of the collar or union, simultaneously compressing a rubber gasket within the coupling, thereby providing a water-tight seal and connection.

Thus connected, the system of the present invention allows accumulated sewage in the onboard holding tank to be dumped quickly, safely and sanitarily into an appropriate waste disposal site.

OBJECTS OF THE INVENTION

A primary object of the present invention is to provide an RV/travel trailer sewage removal system that can be easily, quickly, securely and sanitarily connected to a stationary waste disposal site or sewage collection manifold in a manner that prevents inadvertent spillage of raw sewage.

Another object of the present invention is to provide an RV/travel trailer sewage removal system with hoses of differing lengths that may be securely coupled to create a sewage disposal conduit of greater length.

Another object of the present invention is to provide an RV/travel trailer sewage removal system whose surfaces that come in contact with raw sewage may be completely flushed and disinfected before disconnection.

Another object of the present invention is to provide an RV/travel trailer sewage removal system that may be easily carried within a standard RV/travel trailer storage compartment.

Another object of the present invention is to provide an RV/travel trailer sewage removal system that requires minimal rotation of the sewage hose to fully engage the hose end couplings to connection points at the holding tank and stationary waste disposal site.

Another object of the present invention is to provide an RV/travel trailer sewage removal system of simple and reliable manufacture, made from commonly available materials.

Another object of the present invention is to provide an RV/travel trailer sewage removal system which can be adapted securely to stationary waste disposal sites by having a variety of inlet configurations.

Other further objects of the present invention will become apparent from a careful reading of the included drawing figures, the claims and detailed description of the invention.

BRIEF DESCRIPTION OF THE DRAWINGS

FIG. 1 is a perspective view of the sewage removal system of the present invention, illustrating connection between the vehicle's sewage holding tank and a stationary in-ground waste disposal site.

FIG. 2 is an exploded view of that same view shown in FIG. 1.

DESCRIPTION OF THE PREFERRED EMBODIMENT

Figure 3:
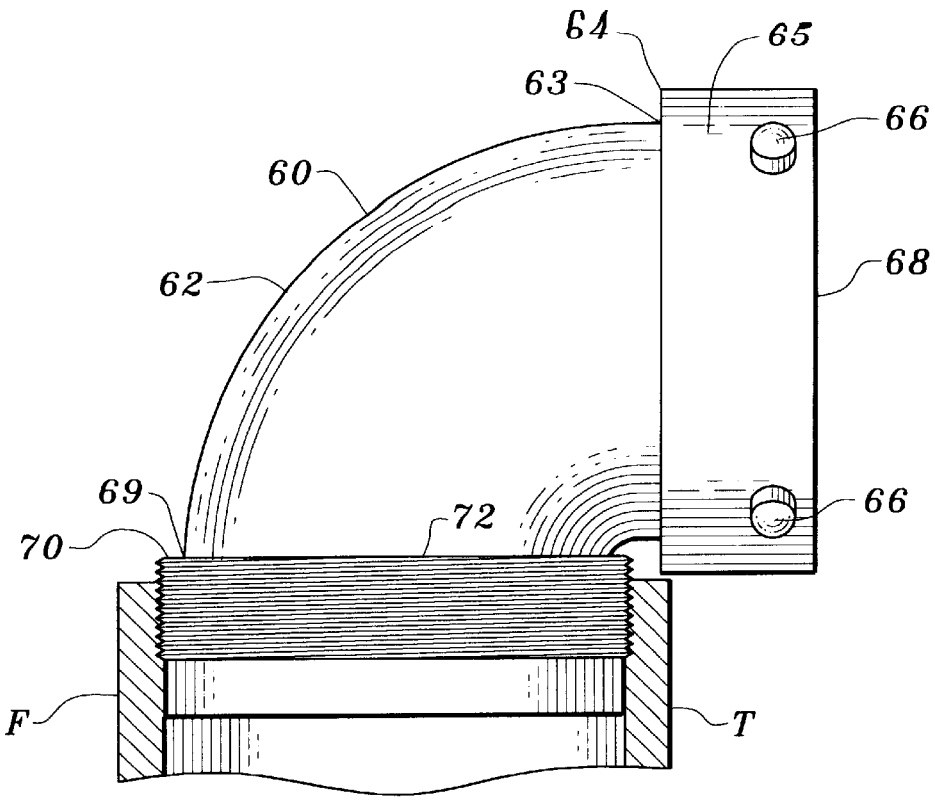
FIG. 3 is a side elevation view of the male elbow adapter of the present invention, installed in a female threaded pipe fitting from a stationary in-ground waste disposal site.

Referring to the drawings, wherein like reference numerals represent like parts throughout the various drawing figures, reference numeral 10 (FIGS. 1 and 2) is directed to a sewage removal system for quickly connecting a recreational vehicle's ("RV") or travel trailer's onboard sewage holding tank H with an in-ground stationary sewage waste disposal site S. The sewage removal system 10 allows sewage hoses 20, 21 to be connected with sealing interfaces between the onboard holding tank H and the in-ground site S.

In essence, and with initial reference to FIGS. 1 and 2, the basic details of the sewage removal system 10 of the present invention are described. The present invention includes a sewage hose 20 or hoses 20, 21 together of sufficient length to stretch from the onboard holding tank H of an RV or travel trailer to a nearby stationary waste disposal site S. Quick connect couplings 30 are attached to each of the ends 22 of the hoses 20, 21. Locking hooks 40 extend from the couplings 30. A union 50 is adapted to receive and connect with the locking hooks 40 on the couplings 30 of separate hoses 20, 21 to create a conduit of greater length, if necessary. Elbow adapters 60, having either a male threaded connector 70 or a female threaded connector 80, are provided for joining one end 22 of the hose 20, 21 to an inlet tube T of the stationary waste disposal site S.

Figure 4:
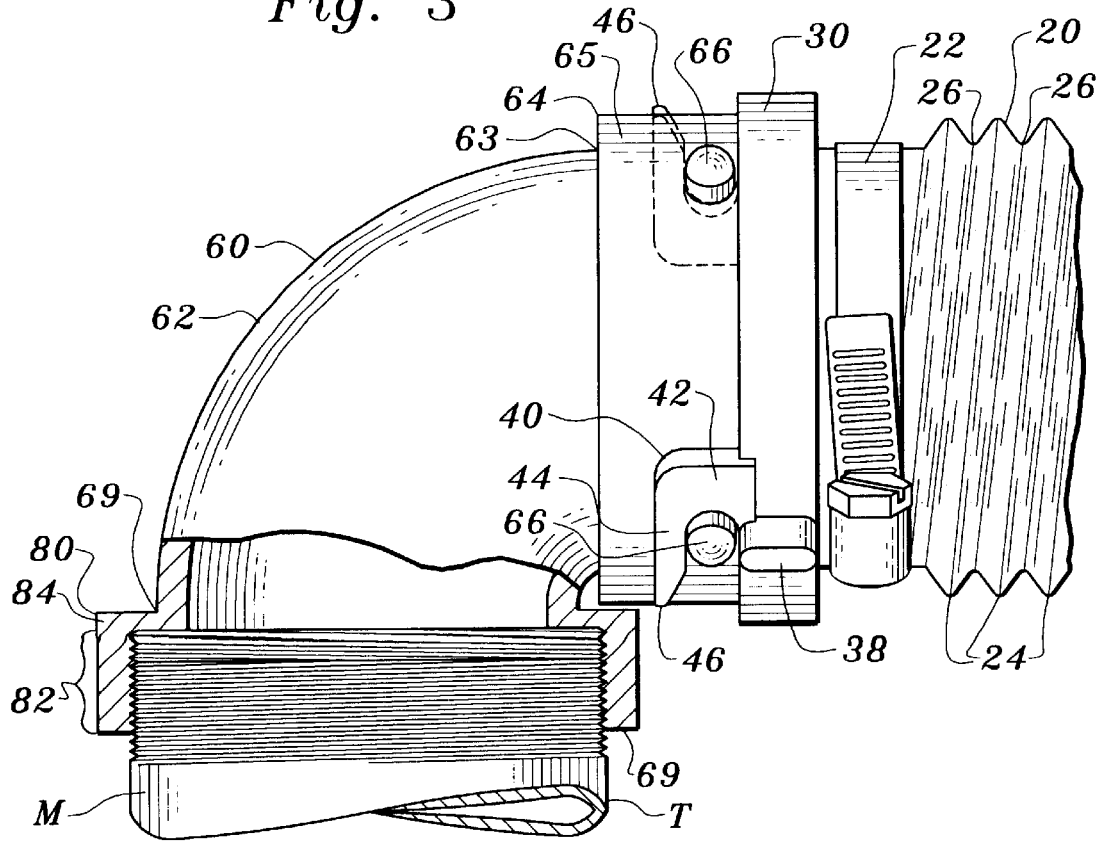
FIG. 4 is a side elevation and partial section view of the female elbow adapter of the present invention installed over a male threaded pipe fitting from a stationary in-ground waste disposal site.
Figure 5:
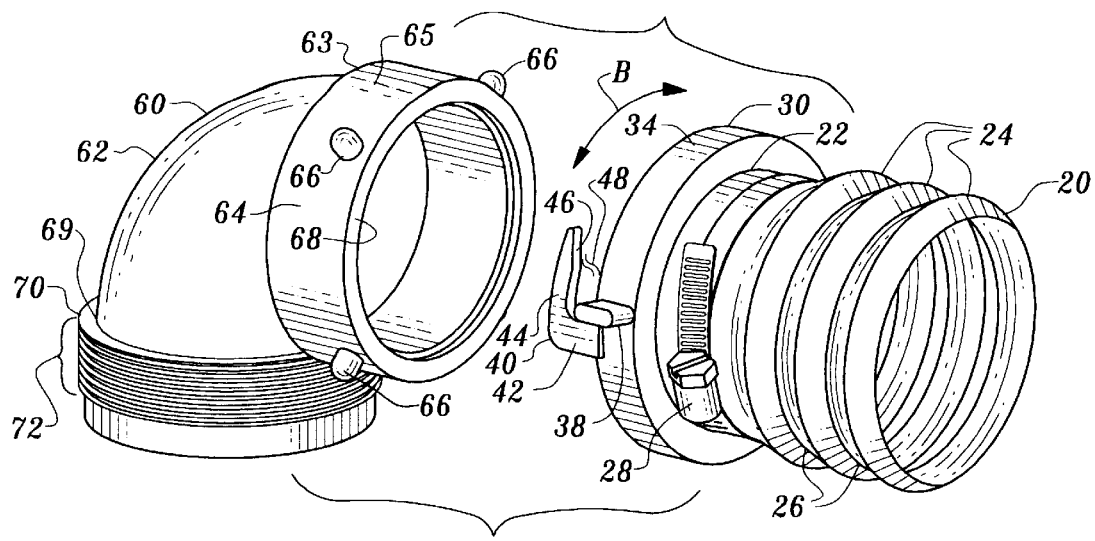
FIG. 5 is is an exploded perspective view of the the quick connect coupling of the present invention, illustrating assembly with the male elbow adapter.
Figure 6:
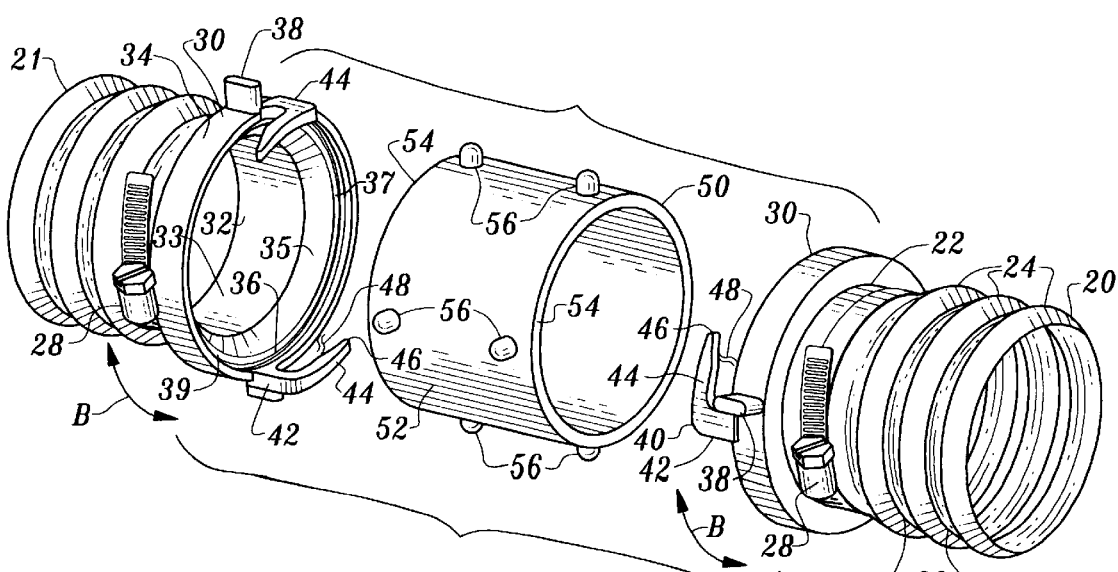
FIG. 6 is an exploded perspective view of the quick connect union of the present invention used to join two separate lengths of sewage hose together.

More particularly, and with specific initial reference to FIGS. 1 and 2, the details of the hoses 20, 21 of the RV sewage removal system 10 of the present invention are described. The system 10 preferably includes both a ten-foot long sewage hose 20 and a twenty-foot long hose 21. The hoses 20, 21 have separate and opposing ends 22. Preferably, the hoses 20, 21 are made of a spiral-wound material which creates a plurality of peaks 24 adjacent a plurality of corresponding valleys 26 (FIGS. 4, 5 and 6). The peaks 24 and valleys 26 provide the hoses 20, 21 with sufficient flexibility to ease installation and connection between the onboard holding tank H and the stationary waste disposal site S. In addition, the peaks 24 and valleys 26 cause the hoses 20, 21 to have an accordion-like capability which allows the hoses 20, 21 to stretch or shorten somewhat to accommodate varying distances between the onboard holding tank H and the stationary disposal site S. This accordion-like quality also allows the hoses 20, 21 to be collapsed into a smaller package for compact storage in a compartment on the RV or travel trailer. Separate pipe clamps 28 are used to join the ends 22 of the hoses 20, 21 to circular quick-connect couplings 30.

As shown in FIGS. 1 and 2, the quick-connect couplings 30 are joined to the ends 22 of the hoses 20, 21. A nesting cylinder portion 32 (FIGS. 7 and 8) of the coupling 30 is inserted into an end 22 of a hose 20, 21. A pipe clamp 28 (FIGS. 5 and 6) wraps about both the end 22 of the hose 20, 21 and the nesting cylinder 32 of the coupling 30. The pipe clamp 28 is tightened to secure the end 22 of the hose 20, 21 to the coupling 30. The nesting cylinder 32 includes an inner surface 33 (FIGS. 7 and 8).

Figure 7:
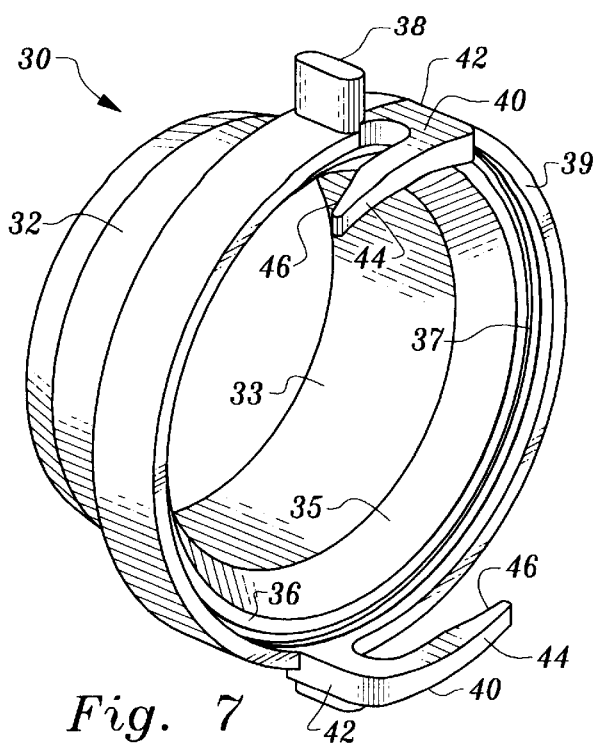
FIG. 7 is a perspective view of a quick-connect coupling of the present invention, detached from the end of a sewage hose.
Figure 8:
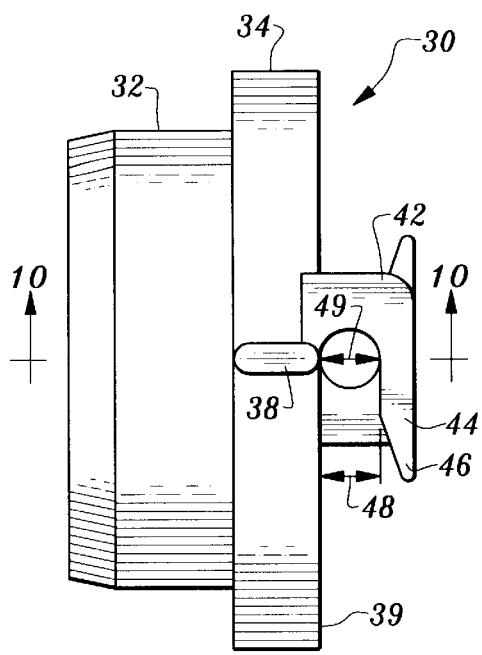
FIG. 8 is a top view of a quick-connect coupling of the present invention.
Figure 9:
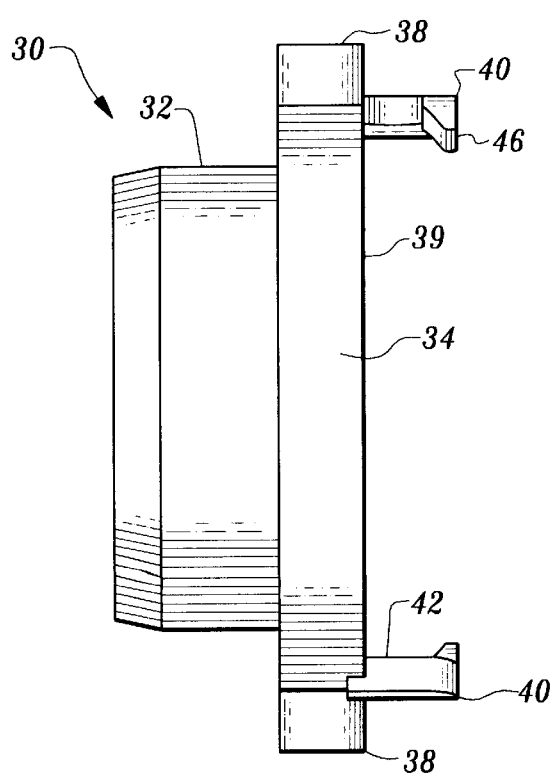
FIG. 9 is a side view of a quick-connect coupling of the present invention.
Figure 10:
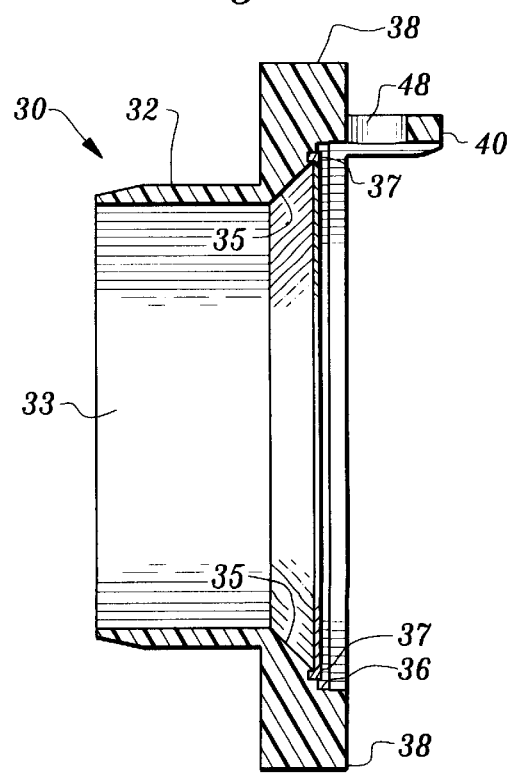
FIG. 10 is a side view of a quick-connect coupling of the present invention taken in cross-section along the lines 10—10 of FIG. 8.

With particular reference to FIGS. 7 and 8, a larger outer cylinder 34 of the coupling 30, having a greater diameter than the nesting cylinder 32, extends from an end of the nesting cylinder 32. A slope 35 extends between the inner surface 33 of the nesting cylinder 32 and an inner ledge 36 of the outer cylinder 34 of the coupling 30. A sealing rubber gasket 37 (FIGS. 7 and 10) is attached adjacent the inner ledge 36 of the outer cylinder 34 to form a liquid-tight seal when the coupling 30 is connected. Two diametrically opposed ears 38 extend radially outward from the outer cylinder 34 of the coupling 30. The ears 38 provide a means to rotate and apply torque in a rotational direction as shown by the Arrow B in FIGS. 5 and 6 to the coupling 30 to connect or disconnect the sewage removal system 10. An annular rim 39 extends perpendicularly and radially inward from the outer cylinder 34 of the coupling 30 (FIGS. 7–9).

With specific reference to FIGS. 7–10, two diametrically-opposed locking hooks 40 extend from the annular rim 39 of the coupling 30 in a direction away from the nesting cylinder 32 of the coupling 30. A first axial leg 42 of the locking hook 40 is attached to and extends axially away from the rim 39 to form the base of the locking hook 40. A second circumferential leg 44 of the locking hook 40 extends somewhat perpendicularly from the axial leg 42 in a direction substantially parallel to the rim 39 of the coupling 30. Thus, the circumferential leg 44 of the locking hook 40 has a radius of curvature substantially equivalent to that of the annular rim 39 of the coupling 30. A tapered tip 46 is formed at the free end of the circumferential leg 44 of the locking hook 40. The circumferential leg 44 of the locking hook 40 is spaced away from the annular rim 39 of the coupling 30 by a notch 48. The rim 39 of the coupling 30 and the axial and circumferential legs 42, 44 of the locking hook 40, cooperate to form the periphery of the notch 48. The notch 48 has a width 49 nearest the axial leg 42 of the hook 40.

As most clearly shown in FIG. 6, a cylindrical union 50 is provided for joining separate hoses 20, 21 to form a single hose 20, 21 of greater length, if necessary. The union 50 has a cylindrical outer surface 52. The cylindrical outer surface 52 has an outer diameter only slightly less than the inner diameter of the outer cylinder 34 and the annular rim 39 of the coupling 30 and slightly greater than the inner diameter of the inner ledge 36 of the coupling. Opposing annular ends 54 of the union 50 extend radially inward from the cylindrical outer surface 52 of the union 50. The annular ends 54 of the union 50 rest adjacent the sealing rubber gasket 37 and inner ledge 36 of the coupling 30 when the union 50 is connected to the coupling 30. The annular ends 54 are smooth to seal with the gasket 37. Four preferably cylindrical posts 56 extend radially outward from the cylindrical outer surface 52 of the union 50 near each end 54 of the union 50.

The protruding posts 56 of the union 50 are preferably spaced every 90° about the periphery of the cylindrical outer surface 52 of the union 50. The posts 56 have a diameter substantially equivalent to the width 49 of the notch 48, so that the posts 56 can be frictionally engaged by the locking hook 40. Two diametrically opposed posts 56 will be located within the notches 48 of the diametrically opposed locking hooks 40 of the coupling 30 when the coupling 30 is connected to an annular end 54 of the union 50. If only a single hose 20 or hose 21 is used in the system 10, the union 50 is not necessary.

As shown in FIGS. 3 and 4, the sewage removal system 10 includes at least two separate elbow adapters 60 to accommodate inlet tubes T having either a male threaded riser M or a female threaded riser F. A first elbow adapter 60, shown in FIG. 3, includes a male threaded connector 70 having outside differential threads 72 adapted to threadably connect to a female threaded fitting F on the end of the inlet tube T. A second elbow adapter 60, shown in FIG. 4, includes a female threaded connector 80 with a cylindrical band 84 having inside differential threads 82 for threadably connecting with a male threaded fitting M on the end of the inlet tube T.

The elbow adapters 60 are provided in the system 10 for joining one end 22 of a hose 20, 21 to an inlet tube T of the stationary waste disposal site S. The elbow adapters 60 each include an upper end 63 and opposing lower end 69. A bend 62 is preferably interposed between the upper end 63 and lower end 69 of the elbow adapters 60. As shown in FIGS. 3 and 4, the bend 62 preferably creates a 90° turn in the elbow adapters 60. This 90° turn in the elbow adapters 60 allows one to more easily connect the hose 20, 21 and coupling 30 to the appropriate adapter 60 when the adapter is installed atop the vertical inlet tube T of a stationary waste disposal site S. The adapters 60 could also be configured without a bend, or, at varying angles from 0° to 90°.

A circular collar 64 extends from the upper end 63 of the elbow adapter 60 to form a cylindrical surface 65. Four preferably cylindrical knobs 66 extend radially outward from the cylindrical surface 65 of the collar 64. As with the posts 56 on the union 50, the knobs 66 are preferably spaced every 90° about the periphery of the cylindrical surface 65 of the collar 64. The knobs 66 also have a diameter substantially equivalent to the width 49 of the notch 48 of the locking hook 40 on the coupling 30 to provide frictional engagement of a knob 66 within the notch 48 of a locking hook 40.

An annular face 68 extends radially inward from the cylindrical surface 65 of the collar 64. The knobs 66 of the elbow adapter 60 are spaced a distance away from the annular face 68 of the adapter 60 approximately equivalent to the distance by which the notch 48 of the locking hook 40 is spaced away from the inner ledge 36 of the coupling 30. Thus, when the collar 64 of the adapter 60 is engaged within the coupling 30, one of the notches 48 will be aligned to sidably receive one of the knobs 66. The knobs 66 will be located within the notches 48 by less than 90° rotation of the coupling 30.

With reference to FIGS. 1, 2 and 3, the use and operation of the RV sewage removal system 10 of the present invention is described. The system 10 provides a simpler and more sanitary means for connecting an onboard holding tank H to a stationary waste disposal site S. Typically, the stationary waste disposal site S is buried beneath the ground G. The onboard holding tank H includes an outlet pipe P which extends from the bottom of the onboard holding tank H. The outlet pipe P includes a cylindrical ring X at its distal end which may be joined to a hose 20, 21 when dumping the contents of the tank H. Tabs Y extend radially outward from the ring X and provide a means for connecting a coupling 30 to the outlet pipe P. As with the posts 56 of the union 50 and the knobs 66 of the elbow adapter 60, the tabs Y of the ring X are sized to slidably and frictionally engage with the locking hooks 40 on a coupling 30. Preferably, the cylindrical ring X is identical in form to the collar 64 and the tabs 4 are identical to the knobs 66 so that couplings 30 on the ends 22 of the hoses 20, 21 can be identical to each other and the hoses 20, 21 can be reversed.

One end 22 of a hose 20, 21 is first rotatably connected to the outlet pipe P of the holding tank H via a coupling 30 and locking hook 40. Next, the hose 20, 21 is stretched toward the inlet tube T of the stationary waste disposal site S. If the inlet tube T has a female threaded fitting F, then the elbow adapter 60 having a male threaded connector 70 is first threadably secured to the female fitting F. Conversely, if the inlet tube T has a male threaded fitting M, the elbow adapter 60 having a female threaded connector 80 is first threadably secured to the male fitting M. As shown in FIGS. 3 and 4, the separate elbow adapter 60 is independently secured to the inlet tube T of the stationary waste disposal site S before connecting the hoses 20, 21.

Should the tube T have a different diameter than the lower end 69 of the adapter 60, an appropriate stepped threaded adapter can be used to provide compatibility between the adapter 60 and the tube T. Alternatively, a resilient collar, referred to as a "donut" can be used to interface between the adapter 60 and the tube T.

Once the appropriate elbow adapter 60 has been installed on the inlet tube T, the free end 22 of the hose 20, 21 is connected to the collar 64 of the elbow adapter 60 by rotatably engaging the locking hook 40 extending from the coupling 30 with the knobs 66 extending from the cylindrical surface 65 of the collar 64 at the upper end 63 of the elbow adapter 60.

The end 22 of the hose 20, 21 is joined to the elbow adapter 60 by first positioning the coupling 30 so that the locking hooks 40 are located between the knobs 66 of the elbow adapter 60. This is accomplished by sliding the coupling 30 over the collar 64 on the upper end 53 of the elbow adapter 60 until the gasket 37 along the inner ledge 36 of the coupling 30 rests adjacent the annular face 68 of the elbow adapter 60. The coupling 30 is then manually rotated clockwise, as shown by Arrow B in FIG. 5, by placing torque on the ears 38 so that the locking hooks 40 on the coupling 30 begin to engage two protruding knobs 66 on the elbow adapter 60. As the coupling 30 is rotated, the knobs 66 will slidably contact the tapered tip 46 of the circumferential leg 44 of the locking hooks 40. As the coupling 30 is rotated to fully engage the locking hooks 40 with the corresponding tabs 66, the lateral movement of the tabs 66 along the tapered tips 48 of the locking hooks 40 causes the inner ledge 36 of the coupling 30 and the annular face 68 of the elbow adapter 60 to be drawn more tightly together, thereby compressing the rubber sealing gasket 37 within the coupling 30 to form a water-tight seal between the coupling 30 and the elbow adapter 60.

In the event additional hose length is needed, the ten-foot hose 20 and twenty-foot hose 21 may be coupled to form a thirty-foot hose length 20, 21. The hoses 20, 21 are joined by coupling an end 22 of each hose 20, 21 to opposing annular ends 54 of the union 50 (FIG. 6). The union 50 is engaged with the couplings 30 in a similar manner as described above for connecting the coupling 30 or a hose 20, 21 to the elbow adapter 60. The locking hooks 40 on the couplings 30 on the ends 22 of each hose 20, 21 rotatably engage the posts 56 extending from the outer surface 52 of the union 50. As the locking hooks 40 fully engage the posts 56, the inner ledge 36 of each coupling 30 is drawn tightly against the annular end 54 of the union, thereby compressing the gasket 37 in the coupling 30 between the inner ledge 36 of the coupling 30 and the annular end 54 of the union 50 to form a watertight seal.

As shown in FIG. 1, once the hoses 20, 21 have been securely joined and opposing free ends 22 of the hoses 20, 21 connected to both the outlet pipe P of the onboard holding tank H and the inlet tube T of the stationary waste disposal site S, a dump valve on the outlet pipe P of the onboard holding tank H is opened. Sewage then flows in the direction indicated by the arrows A, by gravity flow typically, through the sewage removal system 10, and into the inlet tube T of the stationary waste disposal site S.

Once the onboard holding tank H has been emptied and flushed with fresh water, the sewage removal system 10 may be disassembled and rolled up for compact storage in an appropriate compartment within the RV or travel trailer. After the hoses 20, 21 have been thoroughly flushed, the hose 20, 21 coupled to the holding tank H may be disconnected and rolled toward the stationary waste disposal site S so that remaining fluid flows toward and into the inlet tube T of the stationary waste disposal site S. Then, the ends 22 of the hoses 20, 21 may be uncoupled from the union 50 (FIG. 6) by simply rotating each coupling 30 in a counterclockwise direction, as shown by arrow B in FIG. 6, to disengage the locking hooks 40 of the coupling 30 from the posts 56 of the union 50. The end 22 of the remaining hose 20, 21 still connected to the adapter 60 atop the inlet tube T may then be similarly uncoupled from the elbow adapter 60 and stowed in the RV or travel trailer. Next, the elbow adapter 60 may be unthreaded from the male or female fitting M, F of the inlet tube riser T of the stationary waste disposal site S and stowed in a compartment along with the remainder of the sewage removal system 10 components.

This disclosure is provided to reveal a preferred embodiment of the invention and a best mode for practicing the invention. Having thus described the invention in this way, it should be apparent that various different modifications can be made to the preferred embodiment without departing from the scope and fair meaning of this disclosure. When structures are identified as a means to perform a function, the identification is intended to include all structures which can perform the function specified.

What is claimed is:

1. A system for secure delivery of sewage from a mobile holding tank to a stationary waste disposal site, the stationary waste disposal site presenting a threaded inlet tube for attachment to the sewage removal system and the holding tank presenting an outlet pipe with a cylindrical ring having tabs extending radially therefrom for attachment to the sewage removal system, the system comprising in combination:

a hollow adapter having an upper end and a lower end;

said lower end having a threaded surface configured to interface with the threaded inlet tube of the stationary waste disposal site, such that fluids passing through said hollow adapter can pass into said inlet tube;

said upper end having a cylindrical collar with at least two knobs extending radially therefrom;

a hose, said hose having a first end and a second end;

said first end having a first coupling thereon with a tab and ring fastener capable of attaching and detaching with the tabs and the cylindrical ring of the outlet pipe, such that fluids passing out of the outlet pipe can pass into said hose; and said second end having a second coupling thereon with a knob and collar fastener capable of attaching and detaching with said knobs and said collar of said upper end of said hollow adapter, such that fluids passing through said hose can pass into said hollow adapter.

2. The system of claim 1 wherein said first coupling and said second coupling of said hose are sufficiently similar to be interchangeable with said first coupling attachable to said upper end of said hollow adapter and said second coupling attachable to the cylindrical ring of the outlet pipe, such that said hose is reversible within said system.

3. The system of claim 2 wherein each coupling includes an outer cylinder with an inner surface at least as large as the cylindrical ring of the outlet pipe and at least as large as said collar of said upper end of said hollow adapter, such that said outer cylinder can be placed over the ring of the outlet pipe or said collar of said upper end of said hollow adapter; and wherein both said tab and ring fastener of said first coupling and said knob and collar fastener of said second coupling include at least two locking hooks extending from an end of said outer cylinder opposite said hose, said locking hooks including an axial leg extending substantially axially away from said outer cylinder and a circumferential leg extending substantially circumferentially about a central axis of said outer cylinder, said circumferential leg extending from an end of said axial leg opposite said outer cylinder, said circumferential leg spaced from said outer cylinder by a notch, said notch having a width similar to a width of the tabs of the cylindrical ring and a width of said knobs of said collar.

4. The system of claim 3 wherein each said coupling includes an inner ledge of generally annular form located on said inner surface of said outer cylinder, said inner ledge spaced from a rim of said outer cylinder, said inner ledge extending inward toward a central axis of said outer cylinder, said inner ledge defining one side of said inner surface and said rim defining the other side of said inner surface, said inner ledge having an inner diameter less than a diameter of portions of the cylindrical ring and said collar, such that the cylindrical ring and said collar cannot pass into said outer cylinder of said coupling beyond said inner ledge; and an axial distance between said inner ledge and said notches being substantially equal to a distance between said tabs of said cylindrical ring and a distal edge of the cylindrical ring and similar to a distance between said knobs on said collar and a distal end of said collar, such that the distal end of the cylindrical ring is adjacent said inner ledge when the tabs are located within said notches and said distal end of said collar is adjacent said inner ledge when said knobs of said collar are located within said notches of said coupling.

5. The system of claim 4 wherein each said locking hook is located 180° offset from another said locking hook and wherein said knobs extending from said collar each have a similar knob spaced 180° therefrom.

6. The system of claim 5 wherein a resilient gasket is located adjacent said inner ledge of said coupling and said distal end of said collar is configured as an annular face with a sufficiently smooth surface to seal with said gasket when said annular face is located adjacent said gasket; and wherein said circumferential leg of said locking hooks includes a tapered tip which causes said notch to be wider adjacent a portion of said circumferential leg spaced from said axial leg and narrower adjacent a portion of said circumferential leg attached to said axial leg, such that as said locking hook is rotated around one of said knobs, causing said knob to pass into said notch, said annular face is pressed against said gasket adjacent said inner ledge to apply force tending to compress said gasket and seal said coupling with said annular face of said collar.

7. The system of claim 1 wherein said collar and said knobs extending from said collar are substantially similar to the cylindrical ring and the tabs of the outlet pipe.

8. The system of claim 7 wherein said hollow adapter includes a bend between said upper end and said lower end.

9. The system of claim 8 wherein said threaded surface of said lower end is provided with female threads configured to mesh with a male threaded fitting on the threaded inlet tube of the stationary waste disposal site.

10. The system of claim 8 wherein said threaded surface of said lower end includes male threads configured to mesh with a female threaded fitting formed with the threaded inlet tube of the stationary waste disposal site.

11. The system of claim 10 wherein said male threads of said threaded surface of said lower end have a differential relationship with the female threaded fitting of the threaded inlet tube of the stationary waste disposal site, such that said lower end of said hollow adapter seals with the threaded inlet tube of the stationary waste disposal site when said hollow adapter is sufficiently rotated to cause the differential between said male threads and the female threaded fitting to interfere.

12. The system of claim 1 wherein said system additionally includes a union, said union having a cylindrical outer surface with two annular ends and with posts extending radially from said outer surface adjacent said annular ends, said posts and said outer surface configured similarly to said knobs and said collar of said upper end of said hollow adapter, such that said coupling can attach through said knob and collar fastener to said post and said outer surface of said union;

wherein said union has a hollow interior passing through each said annular end; and wherein a second hose is provided having a first coupling and a second coupling similar to said first coupling and said second coupling of said hose, such that said first coupling of said second hose can attach to said cylindrical ring of said outlet pipe and said second coupling of said second hose can attach to said outer surface of said union.

13. A system for transferring sewage from a holding tank to a stationary waste disposal site, the system including:

a hollow flexible sewer hose having a first end and a second end;

said first end having a first coupling including an outer cylinder with at least two locking hooks extending therefrom, portions of said locking hooks spaced from said outer cylinder by a notch with a width at least as small as widths of posts extending radially from portions of said system adjacent to said hose, such that said locking hooks can securely attach to said posts and said first coupling can secure said first end of said hose to an adjacent portion of said system; and said second end having a second coupling comprising an outer cylinder with at least two locking hooks extending therefrom, portions of said locking hooks spaced from said outer cylinder by a notch with a width at least as small as widths of posts extending radially from portions of said system adjacent to said hose, such that said locking hooks can securely attach to said posts and said couplings can secure said ends of said hose to adjacent portions of said system.

14. The system of claim 13 wherein an elbow adapter is interposed between one of said ends of said hose and a threaded inlet tube of the stationary waste disposal site, said elbow adapter including a threaded connector configured to be threadably connected to the threaded inlet tube of the stationary waste disposal site and a collar opposite said threaded connector, said collar including knobs extending radially from said collar, said knobs located at positions on said collar which allow said knobs to be passed into said notches between said locking hooks and said outer cylinders of one of said couplings at one of said ends of said sewer hose, such that said elbow adapter can be securely attached both to said inlet tube of said sewage waste disposal site and said sewer hose, allowing fluids to be securely transferred from said sewer hose, through said elbow adapter and into said stationary waste disposal site.

15. The system of claim 14 wherein said collar of said elbow adapter includes an annular face at an end of said collar opposite said threaded connector and wherein an inner ledge is located on an interior of said outer cylinder of said couplings at each end of said sewer hose, said inner ledge including a gasket located thereon, said inner ledge spaced axially from said notches of said locking hooks a distance similar to a space between said knobs extending radially from said collar and said annular face, such that when said knobs are located within said notches, said annular face is adjacent said gasket, such that a sealed connection between said elbow adapter and said coupling of one of said ends of said sewer hose is provided.

16. The system of claim 15 wherein said first coupling on said first end of said sewer hose and said second coupling on said second end of said sewer hose are functionally interchangeable;

wherein the holding tank includes an outlet pipe with a cylindrical ring having knobs extending radially therefrom, the cylindrical ring and the knobs configured similarly to said collar and said knobs of said elbow adapter, such that said coupling of each said end of said sewer hose can couple either to said elbow adapter or to said outlet pipe of said holding tank, interchangeably;

wherein a union is provided having a cylindrical outer surface with annular ends and posts extending radially from said outer surface, such that each annular end of said union is configured similarly to said knobs and said collar of said elbow adapter, such that either said coupling of either said end of said sewer hose can couple to said union; and wherein a second hose is provided with second hose couplings similar to said couplings of said ends of said sewer hose, such that said second hose and said sewer hose can be coupled together in series with said union there between and with ends of said sewer hose and said second hose opposite said union available to couple to either said collar of said elbow adapter or to said cylindrical ring of said outlet pipe, such that a greater distance can be spanned between the holding tank and said elbow adapter than by said sewer hose alone.

17. The system of claim 16 wherein each said locking hook includes an axial leg extending axially from a rim of said outer cylinder of said coupling and a circumferential leg extending from an end of said axial leg opposite said rim, said circumferential leg spaced from said rim by said notch, an end of said circumferential leg opposite said axial leg tapered, such that said notch is wider at an end of said notch away from said axial leg and narrower adjacent said axial leg, said tapered tip tapered to cause said coupling to be drawn toward said knobs and compress said gasket.

18. A sewage transfer system for emptying sewage from a holding tank into a stationary waste disposal site having an inlet tube extending therefrom with a threaded fitting, the system comprising:

an adapter having a hollow interior extending from an upper end to a lower end;

said upper end having a collar with a cylindrical surface, said cylindrical surface having knobs extending radially therefrom and a substantially smooth annular face; and said lower end having a threaded connector with threads matching the threaded fitting of the stationary waste disposal site, such that said adapter can be threaded into the threaded fitting of the stationary waste disposal site.

19. The sewage transfer system of claim 18 wherein a hose is provided having two ends, each end having a coupling comprising an outer cylinder with at least two locking hooks extending therefrom, portions of said locking hooks spaced from said outer cylinder by a notch with a width at least as small as widths of said knobs, such that said locking hooks can securely attach to said knobs and one of said couplings can secure one of said ends of said hose to said upper end of said adapter in a manner causing fluids passing through said sewer hose to be directed through said adapter and into the inlet tube of the stationary waste disposal site.

20. The sewage transfer system of claim 19 wherein said couplings at said two ends are interchangeable.

\* \* \* \* \*